(12) United States Patent
Liao

(10) Patent No.: US 8,819,311 B2
(45) Date of Patent: Aug. 26, 2014

(54) UNIVERSAL USER INPUT/OUTPUT APPLICATION LAYERS

(75) Inventor: Cheng Liao, Fremont, CA (US)

(73) Assignee: RPX Corporation, San Francisco, CA (US)

( * ) Notice: Subject to any disclaimer, the term of this patent is extended or adjusted under 35 U.S.C. 154(b) by 354 days.

(21) Appl. No.: 11/752,914

(22) Filed: May 23, 2007

(65) Prior Publication Data

US 2008/0295118 A1 Nov. 27, 2008

(51) Int. Cl.
*G06F 3/00* (2006.01)
*G06F 9/54* (2006.01)

(52) U.S. Cl.
CPC ............... *G06F 9/545* (2013.01); *G06F 9/544* (2013.01); *G06F 2205/066* (2013.01)
USPC ................... 710/56; 710/50; 710/54; 710/52; 719/328

(58) Field of Classification Search
CPC ... G06F 9/545; G06F 9/544; G06F 2205/066; G06F 3/00
USPC ........................................... 710/50; 719/328
See application file for complete search history.

(56) References Cited

U.S. PATENT DOCUMENTS

| | | | |
|---|---|---|---|
| 4,771,380 A * | 9/1988 | Kris | 712/6 |
| 6,094,708 A * | 7/2000 | Hilla et al. | 711/138 |
| 6,247,148 B1 * | 6/2001 | Annicchiarico et al. | 714/45 |
| 6,317,134 B1 * | 11/2001 | Hagemark et al. | 345/542 |
| 7,409,561 B1 * | 8/2008 | Kolli et al. | 713/193 |
| 7,555,549 B1 * | 6/2009 | Campbell et al. | 709/224 |
| 8,028,040 B1 * | 9/2011 | Hobbs et al. | 709/219 |
| 2003/0005464 A1 * | 1/2003 | Gropper et al. | 725/115 |
| 2005/0097276 A1 * | 5/2005 | Lu et al. | 711/118 |
| 2006/0013568 A1 * | 1/2006 | Rodriguez | 386/111 |
| 2006/0248234 A1 * | 11/2006 | Pope et al. | 709/250 |

OTHER PUBLICATIONS

Corbet et al., Linux Device Drivers (3rd ed., Feb. 2005) (excerpt), 5 pages.
An introduction to X (Mar. 2006), 5 pages.
Jones et al., Anatomy of the Linux Kernel (Jun. 2007), 8 pages.

* cited by examiner

*Primary Examiner* — Henry Tsai
*Assistant Examiner* — John Roche
(74) *Attorney, Agent, or Firm* — Howison & Arnott, LLP

(57) ABSTRACT

Files on a secondary storage are accessed using alternative IO subroutines that buffer IO requests made by a user and mimic the IO subroutines provided by an operating system. The buffer used by the alternative IO subroutines is maintained by the user and not the operating system. User applications are not recompiled or relinked when using the alternative subroutines because the library that provides these subroutines intercepts requests for buffered IO made by user applications to the operating system's IO subroutines and replaces the requests with calls to the alternative IO subroutines that utilize the buffer maintained by the user.

16 Claims, 9 Drawing Sheets

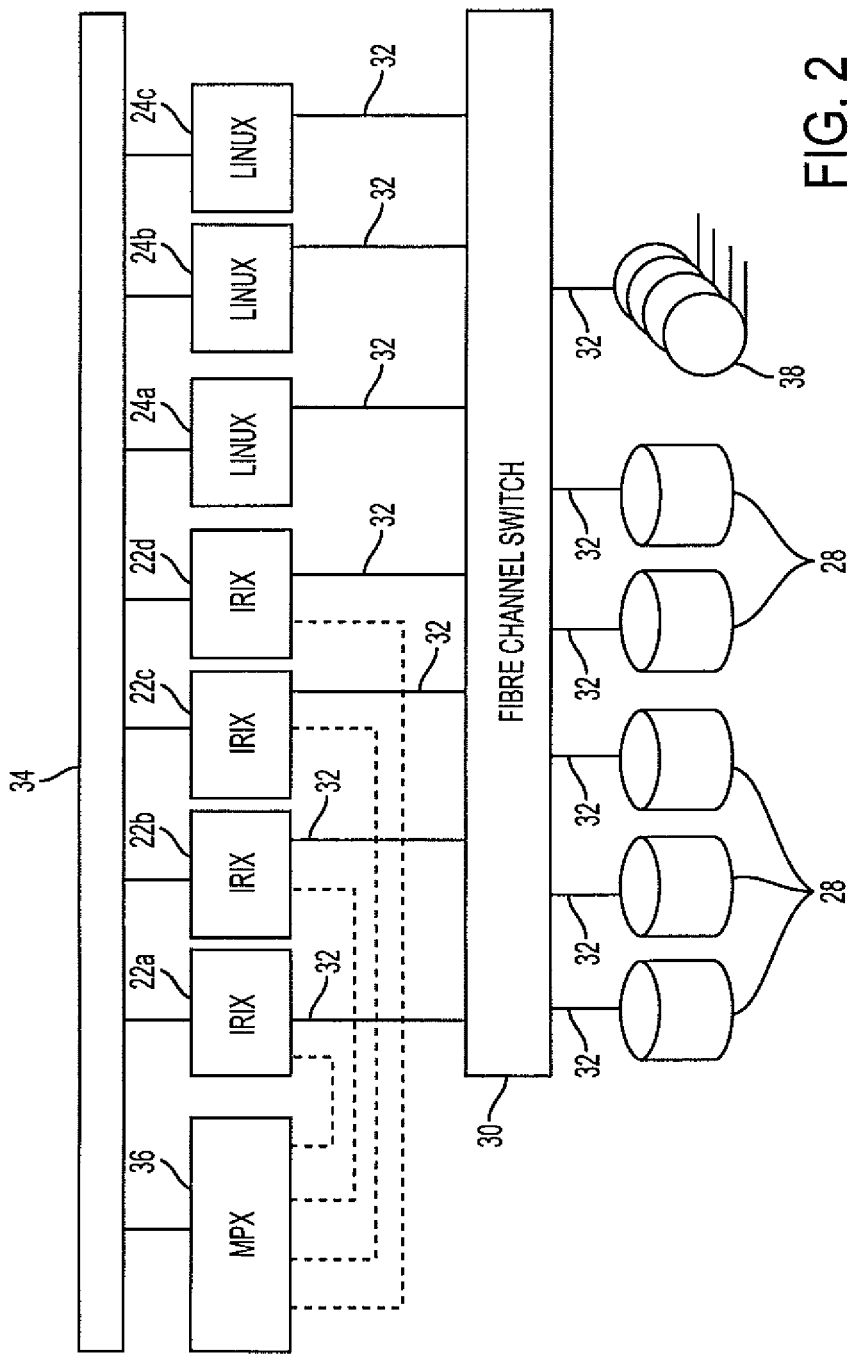

UNIVERSAL USER INPUT/OUTPUT APPLICATION LAYERS

BACKGROUND

Buffering input/output (I/O) is common way to improve performance when accessing secondary storage. Buffered I/O are in contrast to Direct I/O. Buffered I/O are read and write operations requested by an application via subroutines where the source or result of the I/O operation are cached in a main memory before being sent to the requesting application, while direct I/O are read and write operations via system calls where the data is transferred directly between the storage device and the application programs memory without being copied through extraneous buffers.

The principal method of buffering I/O is by linking to standard libraries that buffer I/O requests when an application is being compiled. It is common for the standard libraries provided by an operating system to provide buffered I/O to applications that request POSIX compliant I/O operations. For example, in the Linux kernel, POSIX compliant I/O requests to secondary storage are buffered through the gLIBC library. By doing so, the Linux kernel obscures the use of buffered I/O by not requiring applications to specifically link to libraries that provide buffered I/O. Hence, the buffered I/O provided by the Linux kernel is both universal and relinkless, in that applications do not need to be relinked to a standard IO library to utilize buffered IO. Universal and relinkless buffered I/O provided by an operating system allow application developers to ignore the complexity common to maintaining an I/O cache and still achieve the benefits of maintaining an I/O cache, but there are some pitfalls.

When an operating system buffers I/O automatically, the buffers are treated in a uniform manner. A user cannot adjust the operating parameters of the buffer. This is especially detrimental in High Performance Computing and High Performance Technical Computing (collectively referred to herein as "HPC") applications, where data being accessed by a single application can reach many gigabytes to terabytes in magnitude. To allow for more control and optimize performance of HPC applications, another technique of buffering I/O includes Flexible File IO (FFIO), originally developed by Cray Research. FFIO allows a user to maintain an I/O cache between the user application and the default buffering I/O systems used by the kernel, and control the operating parameters of the buffers in the I/O cache by setting environment variables. The data in the FFIO buffers can then be transferred to and from the storage device with direct I/O, bypassing the kernel I/O buffers. To utilize FFIO, however, applications needed to explicitly link to the FFIO library.

In view of the above, it is clear that there is a need in the HPC industry to combine the universal and relinkless strengths of system I/O with the user-defined optimizations available through the FFIO library.

SUMMARY

It is an aspect of the embodiments described below to provide a user application with at least one of input and output layers, controlled by the user and obscured from the user application.

It is another aspect of the embodiments described below to provide a buffer controlled by a user, stored on a computer-readable medium, and intercepts requests by a user application, executing with assistance from an operating system, for at least one of input and output from the operating system of the user application that do not use the buffer controlled by the user to be replaced with requests for at least one of input and output that do use the buffer controlled by the user.

It is another aspect of the embodiments described below to provide an computer system with a central processing unit, main memory and a secondary storage, configured so that the main memory stores a user controlled buffer and the central processing unit intercepts system-requests to the secondary storage that do not use the user-controlled buffer and replaces the system-requests with user-requests that do use the user-controlled buffer.

It is yet another aspect of the embodiment described below that at least one of the above aspects can be attained by a cluster of computer systems, including storage devices storing at least one mirrored data volume with at least two mirror legs; a storage area network coupled to the storage devices; and computer system nodes, coupled to the storage area network, sharing direct read/write access to the storage devices and maintaining mirror consistency during failure of at least one of said storage devices or at least one of said computer system nodes, while continuing to accept access requests to the mirrored data volume.

Therefore, the present application describes various embodiments for accessing files on a secondary storage using alternative IO subroutines that buffer IO requests made by a user and mimic the IO subroutines provided by an operating system. Additionally, the buffer used by the alternative IO subroutines is maintained by the user and not the operating system. User applications are not recompiled or relinked when using the alternative subroutines because the library that provides these subroutines intercepts requests for buffered IO made by user applications to the operating system's IO subroutines and replaces the requests with calls to the alternative IO subroutines that utilize the buffer maintained by the user.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a block diagram of a cluster computing system.

DETAILED DESCRIPTION OF THE EMBODIMENTS

The method described below may be implemented on computing system or a cluster of computing systems each running IRIX® or Linux, both available from Silicon Graphics, Inc. (SGI) of Mountain View, Calif. For example, HPC users of the libFFIO library can employ a cluster of computing systems such as twin 128 Core Altix4700's from SGI, with 8 gigabytes (GB) memory per core and a large shared file system on each of the A4700's for a large installation, or can have a 16 Central Processing Units (CPUs) with 6 GB memory per CPU and a large shared file system. The file system composed of plurality of hard drives in a Redundant Array of Inexpensive Disks (RAID) or Just Bunch Of Disks (JBOD) configuration. It is important to note the most significant distinctions for industrial users include: (1) large memory, usually more than 4 GB per core or CPU, and (2) large shared file systems with usually more than ten disks in a volume. Less capable systems are contemplated and the embodiments discussed below are not limited by the capabilities described herein. Examples of less capable systems include the Altix XE line of workstations, also by SGI. For example, an HPC workstation may include 4 cores per node, with 4 GB memory per core, and 4 Serial Attached SCSI (SAS) disk drives local storage on each node.

Figure 1A:
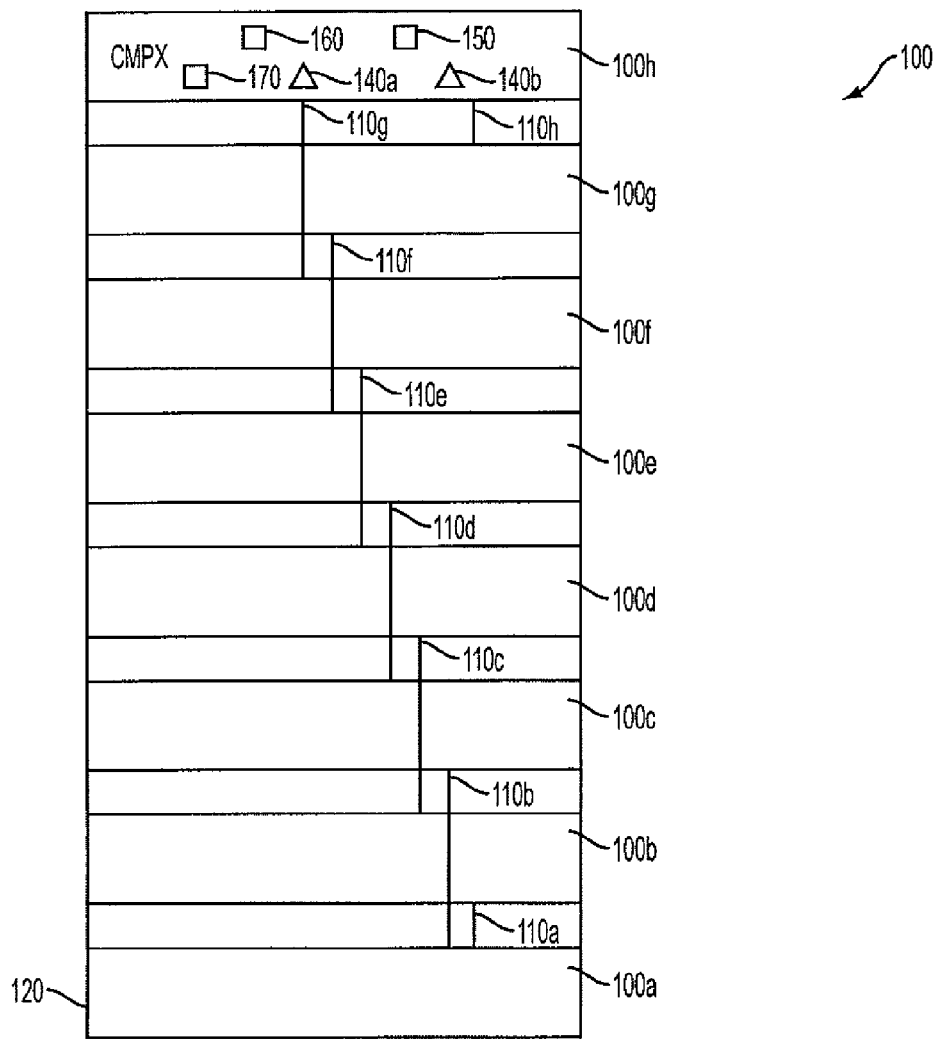
FIGS. 1A and 1B are block diagrams of a typical computer system configuration with multiple central processing units, a main memory and a storage unit.
Figure 1B:
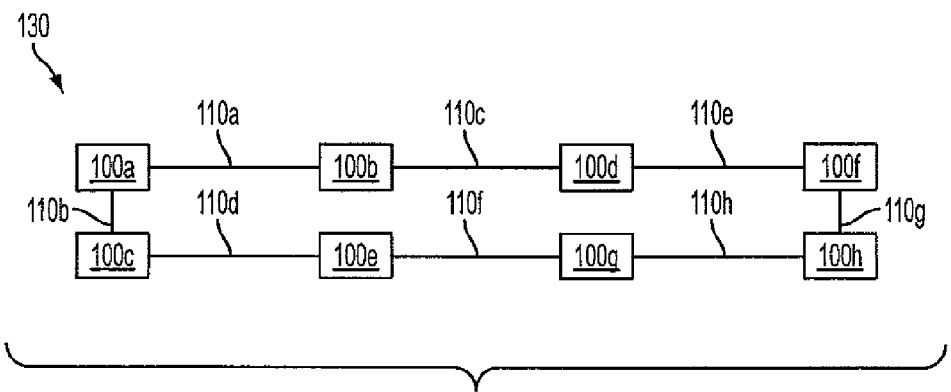

An example of such an HPC system is illustrated in FIG. 1. In the example illustrated in FIG. 1, CPU, Memory and PCI Expansion (CMPX) modules 100a-h are arranged on rack 120 in a NUMAlink® ring 130 network topology as currently used by SGI systems and as illustrated in FIG. 1B. In an exemplary embodiment, each CMPX module 100 may have network interfaces 140a and 140b, two Itanium2 processors operating at 1.5 GHz with a 4 MB cache for each processor on processor board 160 and 12 GB of main memory 160. In addition, each CMPX module may have local storage, such as 160 GB SAS disk drive. NUMAlink® ring 130 is configured such that:

CMPX 100a is directly connected to CMPX 100b via NUMAlink® 110a and to CMPX 100c via NUMAlink® 110b, CMPX 100b is directly connected to CMPX 100a via NUMAlink® 110a and to CMPX 100d via NUMAlink® 110c, CMPX 100c is directly connected to CMPX 100a via NUMAlink® 110b and to CMPX 100e via NUMAlink® 110d, CMPX 100d is directly connected to CMPX 100b via NUMAlink® 110c and to CMPX 100f via NUMAlink® 110e CMPX 100e is directly connected to CMPX 100c via NUMAlink® 110d and to CMPX 100g via NUMAlink® 110f, CMPX 100f is directly connected to CMPX 100d via NUMAlink® 110e and to CMPX 100h via NUMAlink® 110g, CMPX 100g is directly connected to CMPX 100e via NUMAlink® 110f and to CMPX 100h via NUMAlink® 110h, and CMPX 100h is directly connected to CMPX 100f via NUMAlink® 110g and to CMPX 100g via NUMAlink® 110h.

An example of a cluster is illustrated in FIG. 2. In the example illustrated in FIG. 2, nodes 22 a-d each run an IRIX® operating system from SGI while nodes 24a-c each run Linux. Each of these nodes is a conventional computer system including at least one, and in many cases several processors, local or primary memory, some of which is used as a disk cache, input/output (I/O) interfaces, and I/O devices, such as one or more displays or printers. The cluster also includes a storage area network in which mass or secondary storage, such as disk drives 28 are connected to nodes 22 and 24 via Fibre Channel switch 30 and Fibre Channel connections 32. The nodes 22 and 24 are also connected via a local area network (LAN) 34, such as an Ethernet, using TCP/IP to provide messaging and heartbeat signals. A serial port multiplexer 36 may also be connected to the LAN and to a serial port of each node to enable hardware reset of the node. In the example illustrated in FIG. 1, only IRIX® nodes 22 are connected to serial port multiplexer 36.

Other kinds of storage devices besides disk drives 28 may be connected to the Fibre Channel switch 30 via Fibre Channel connections 32. Tape drives 38 are illustrated in FIG. 2, but other conventional storage devices may also be connected. Alternatively, disk drives 28 or tape drives 38 (or other storage devices) may be connected to one or more of nodes 22, 24 e.g., via SCSI connections (not shown).

One use for a cluster like that illustrated in FIG. 2 is a video broadcast studio in which video clips are stored in files on disk drives 28 (or tape drives 38). Non-linear video editors running on heterogeneous nodes 22, 24 modify the video files while the files are accessible for broadcasting on television.

Figure 3:
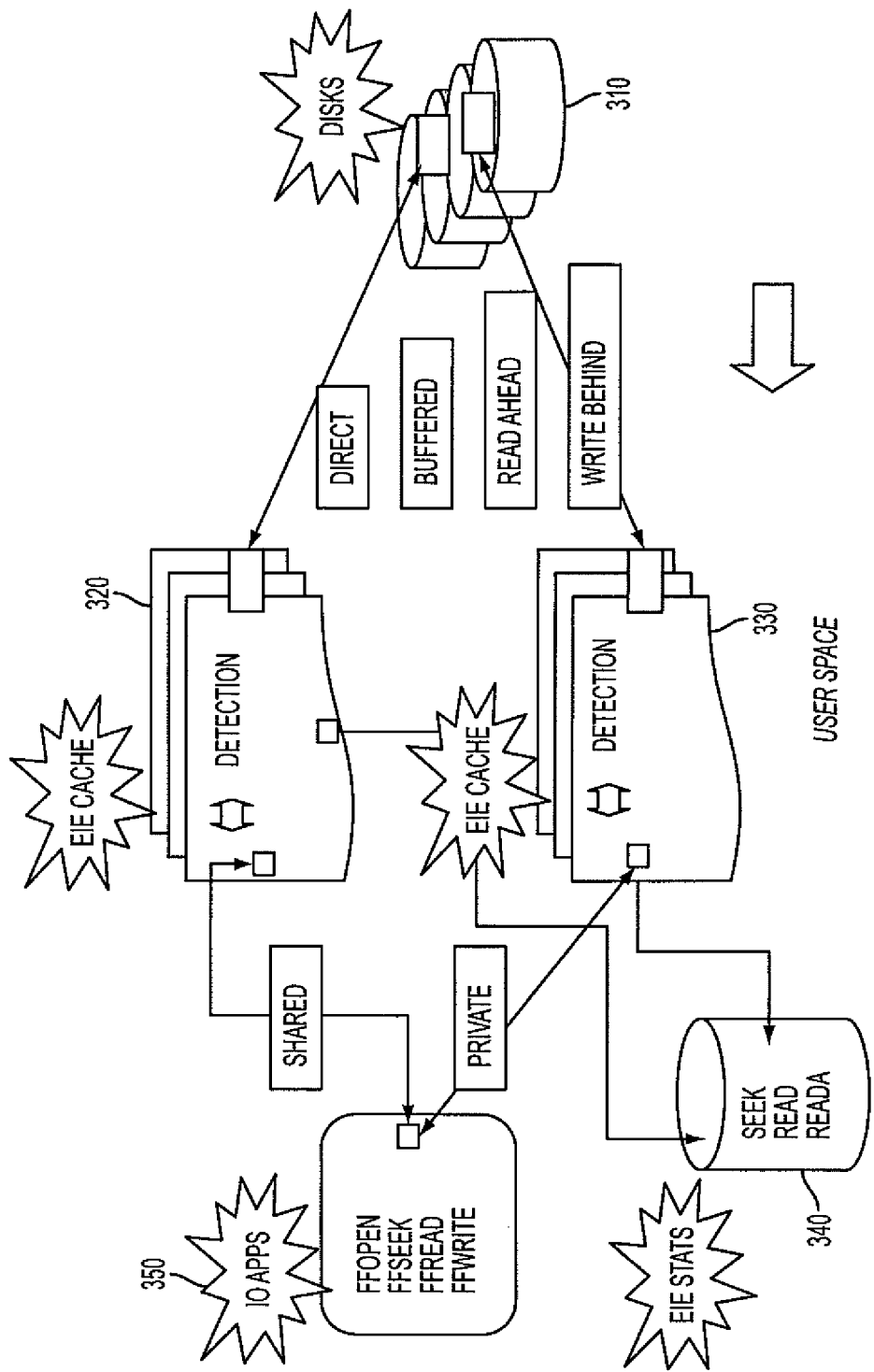
FIG. 3 is a data flow diagram of how an embodiment operates within a typical computer system configuration.

FIG. 3 provides an example of how libFFIO operates within a typical computer system configuration when the method described herein is implemented. The disks 310 offer a variety of access modes through their filesystem. For example, the disks 310 could be accessed via direct or buffered IO, with Read Ahead and Write Behind performance enhancements. There are two embodiments of the Enhanced Intelligence Engineering (EIE) cache illustrated in FIG. 3, shared EIE cache 320 and private EIE cache 330. The operation and performance of these two embodiments are the same, except as specifically noted below. Requests sent to the EIE caches are monitored 330. Statistics are generated through read operations performed on shared EIE cache 320 and private EIE cache 330 and the statistics are logged. An example of useful statistics includes file performance. The collected statistics may be graphed using a graphics program, such as IOX by SGI for example. Finally a user application 350 requests file IO operations from files residing on secondary storage. In one embodiment, the IO operations are from the gLIBC library and may include the following subroutines: open, fopen, open64, _open, _open64, read, fread, pread, pread64, fgets, write, fwrite, pwrite, pwrite64, fputs, fputc, lseek, fseek, lseek64, close, fclose, fflush, mkstemp, mkstemp64, ftruncate, ftruncate64, fprintf and fscanf.

Figure 4:
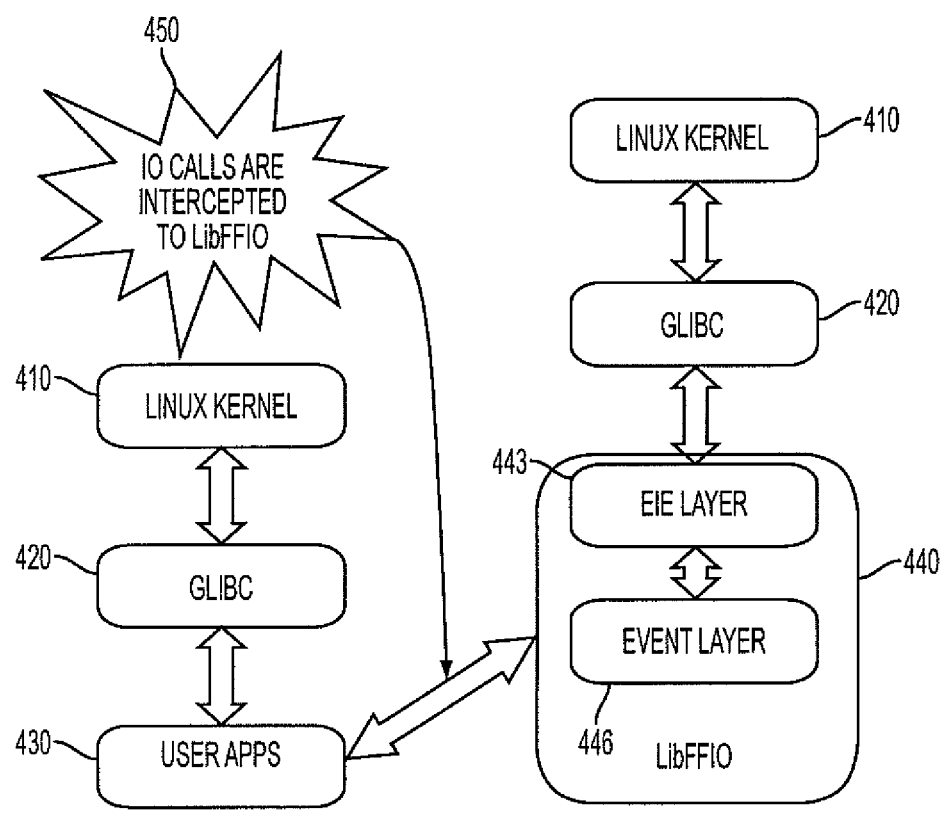
FIG. 4 is a functional block diagram of an embodiment running on the Linux operating system.

FIG. 4 shows the flow of operations in libFFIO 440 on a Linux operating system. Linux Kernel 410, gLIBC 420 and User Apps 430 may perform as the user would expect without any modifications from known operations. Examples of modifications that are not required to use libFFIO 440 include, but are not limited to: kernel modules, specially recompiled user applications that link to the libFFIO 440, user applications that are linked to use libFFIO 440, and special gLIBC patches that alter the default behavior of gLIBC 420. In the embodiment shown, IO requests to gLIBC 420 are intercepted 450 and sent to libFFIO 440. The IO requests are buffered in the EIE layer 443 and monitored in the Event Layer 446. The EIE layer 443, then refers back to gLIBC 420 and Linux Kernel 410 to perform the operations originally requested by the user application.

Interception 440 may occur, for example, by using the dynamic loader and tell it to use libFFIO 440 instead of gLIBC 420. LD_PRELOAD is an environment variable in Linux that instructs the dynamic linker/loader in Linux, ld.so, to load additional libraries into memory when executing a user application. These additional libraries are beyond what was specified when user application was compiled. Thus, one embodiment, the user sets LD_PRELOAD to point to libFFIO 440 so that the operating system (e.g. Linux, IRIX or other UNIX variant) loads libFFIO 440 whenever the user begins executing on an application.

Figure 5B:
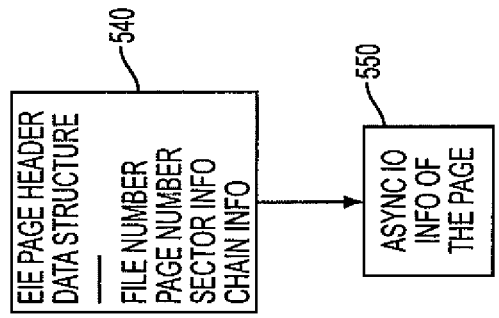
FIG. 5B is a functional block diagram of one page in the embodiment's cache.
Figure 5A:
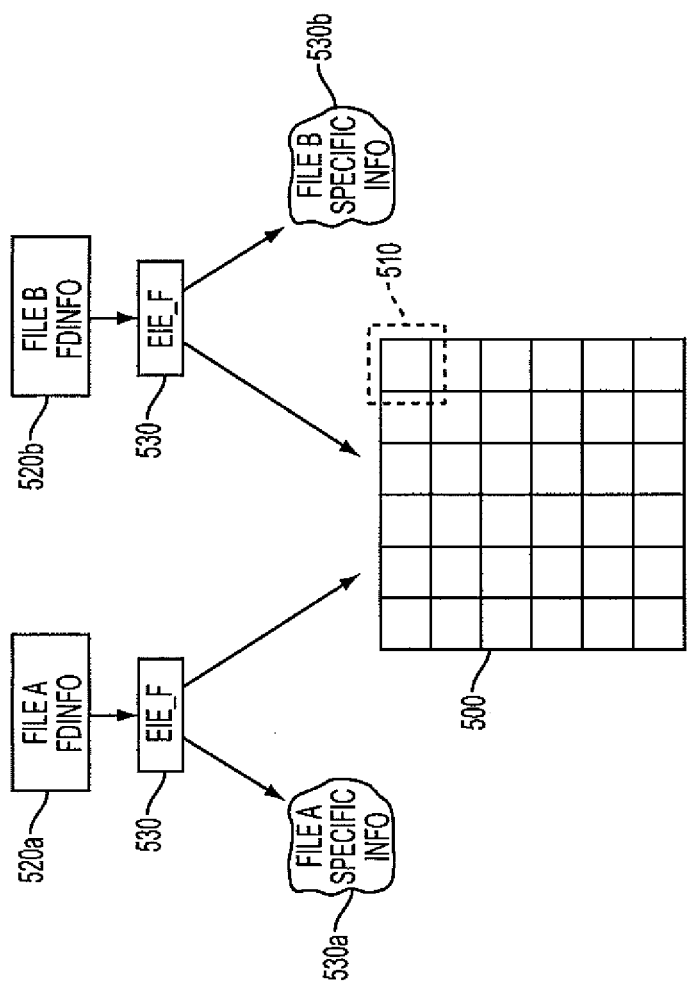
FIG. 5A is a functional block diagram of an embodiment's cache and its operation.

Illustrated in FIG. 5A are the basic data structures used in libFFIO 440. According to the user specifications that are given in the FF_IO_OPTS environment variable, EIE cache 500 is set up in the user memory. The user indicates which layers are to be invoked for selected files in FF_IO_OPTS. EIE cache 500 is created when a file from secondary storage, for example, that matches the FF_IO_OPTS file name template is first opened. Specifically, as shown in FIG. 4, the open/fopen call is intercepted and replaced with the ffopen call in libFFIO 440 when the file name matches the template. Once this match occurs, memory is then allocated for EIE cache 500 and the user specified number of EIE Page 510 and the bookkeeping data structures also are set up accordingly.

As each file is opened by ffopen, ffopen attempts to match the incoming file name with the supplied templates in FF_IO_OPTS. After each file name template in FF_IO_OPTS, a layer is defined in parenthesis when there are multiple layers. Upon finding a match, ffopen will invoke the layers that are specified between the next pair of parentheses. The default behavior is to send all IO requests for a file name matching the template to the EIE cache management layer. FF_IO_OPTS is not limited to a single file name template or a single layer. More than one template may be used for each layer specification string, and there may be more than one pair of template strings/layer specifications. In the case when there is more that one template defined, ffopen reads the templates from left to right. EIE cache 500 consists of a certain number of fixed size EIE pages 510 defined by an environment variable and can be either shared among files or dedicated to just one file. Only the shared cache 500 is illustrated in FIG. 5 and will be discussed here, as that is the most often used type of EIE cache. A private EIE cache works in the same way as the shared cache, except it is for just one file.

Each file opened in libFFIO 440 is identified by a file descriptor (fd) internally. In the embodiment shown in FIG. 5, an fdinfo 520 data structure is created for each file. Fdinfo 520 stores open flags, the file type (such as the magic number) of the file, the real file descriptor of the file, and pointers to the fdinfo data structures of the file's parents and children. Fdinfo 520 can also hold other data of interest. As shown in FIG. 5, fdinfo 520a and fdinfo 520b are created for files A and B respectively.

As shown in the embodiment, fdinfo 520 points to an EIE cache bookkeeping data structure, eie_f 530. The eie_f 530 data structure is created for each file opened, which means eie_f 530a and eie_f 530b store data specific to file A and B respectively. The eie_f 530 data structure stores the internal file number, the current file position, and statistics of the file. The eie_f 530 data structure can also hold other data of interest. For example, eie_f 530 may store pointers to the EIE page header data structures (eie_buf 540, illustrated in FIG. 5B) that are shared by all the files managed by EIE cache 500. The eie_buf 540 data structure stores a 16 bit file number and a 48 bit page number that can be used to identify the file and its offset location that the particular EIE page 510 represents. The eie_buf 540 data structure also contains EIE page 510 state flags, address of the data buffer, sector (when an EIE page 510 is optionally divided into many sectors) bookkeeping information, and prefetch information. The eie_buf 540 data structure can also hold other data of interest. For example, eie_buf 540 may store a pointer to the asynchronous IO state, ffsw_ext 550, when asynchronous IO is required.

Figure 6:
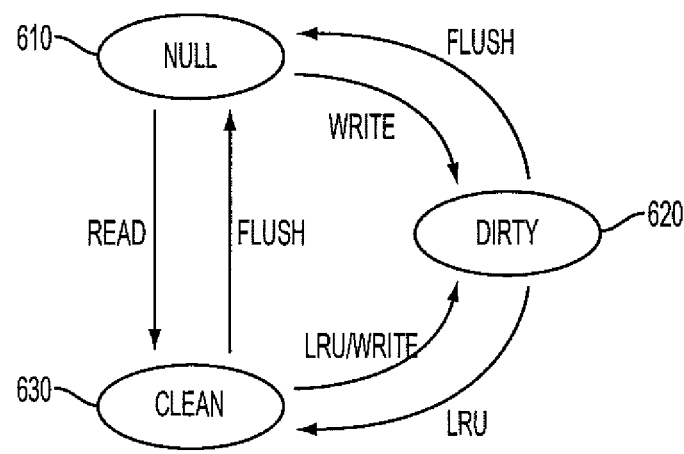
FIG. 6 is a state diagram of an embodiment's cache states.

FIG. 6 illustrates the EIE page states. An EIE page may be in one of three states; a NULL state 610, a dirty state 620, or a clean state 630. An EIE page is in NULL state 610 when the page contains no data (i.e. the entire memory space of that page is set to zero). An EIE page in dirty state 620 contains data that has yet to be flushed to the file system. The EIE page can be either fully or partially written to (which is to say the page is fully or partially dirty) by the user application. Additionally, an EIE page in dirty state 620 may or may not belong to a sequence of read/write calls to be performed (an IO chain). An EIE page in clean state 630 contains data that has not changed since it was read in from the file system. EIE pages that are in either clean state 630 or dirty state 620 also can be in the middle of asynchronous IO operations.

During write back operations, an EIE page that is in dirty state 620, either because it is fully or partially modified, may be written back to the file system with a POSIX real-time asynchronous IO API function (e.g., a function from the real-time library librt) in the next read/write call that operates on the same file. Generally speaking, a previous EIE page that does not belong to the same IO chain would be written back. If the EIE page is in the same chain with the current page, then write-back would happen only if the previous EIE page is also in a dirty 620 state and completely dirty. Additionally, during read ahead operations, libFFIO may detect sequential file access and, optimally when using with a real-time POSIX asynchronous 10 library, pre-fetch the next records of the file. Unless otherwise requested, the contents of a file in the EIE cache are written back during job execution and flushed to the file system upon closing. If a file is never closed by the user application, it will be flushed by libFFIO at the exit time of the application.

Figure 7:
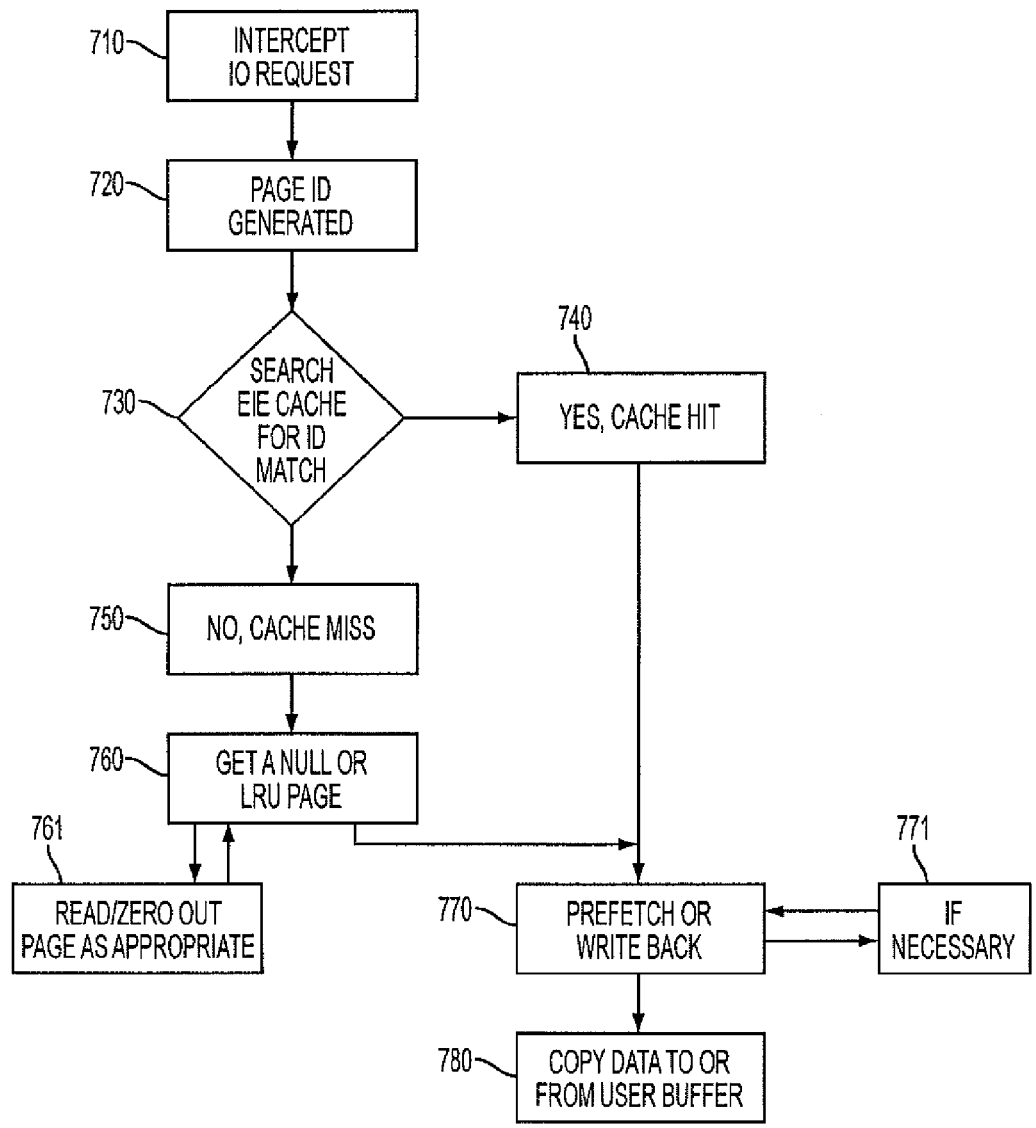
FIG. 7 is a flow chart of how an embodiment responds to read/write operations.

FIG. 7 shows how libFFIO 440 responds to read/write operations. As discussed with reference to FIG. 4, each read/write related IO API call is intercepted 710 by libFFIO 440. An ID consisting of the file and the page numbers is generated 720 after an IO request is intercepted 710. A search 720 through each of the EIE pages is then done to find an ID match 730. If there is not a match, a cache miss is reported 750 and a Least Recently Used (LRU) algorithm is used 740 to free up an occupied EIE page for the new IO request. As illustrated in FIG. 6, the LRU operation will change an EIE page in dirty state 620 to clean state 630 and change an EIE page in clean state 630 to dirty state 620 only when the LRU replace is needed as a result of a write operation. When there is a cache miss, either a NULL or LRU page 760 is used. If possible, when filling 761 an EIE page with new data, the entire page is read from the file system, or the page is zeroed out, and a dirty page is flushed before the filling 761 to ensure data integrity. An EIE page in an IO chain is less likely to be thrown out by the LRU algorithm. Note that the LRU algorithm is skipped in the presence of any EIE page in NULL state 610. Thus, an EIE page in NULL state 610 would be selected over any EIE page in either clean state 630 or dirty state 620. Prefetch or write back 710 may be used as necessary 771 once the EIE page that has been requested is in EIE cache. Data is then copied to or from the user's buffer 780.

Figure 8:
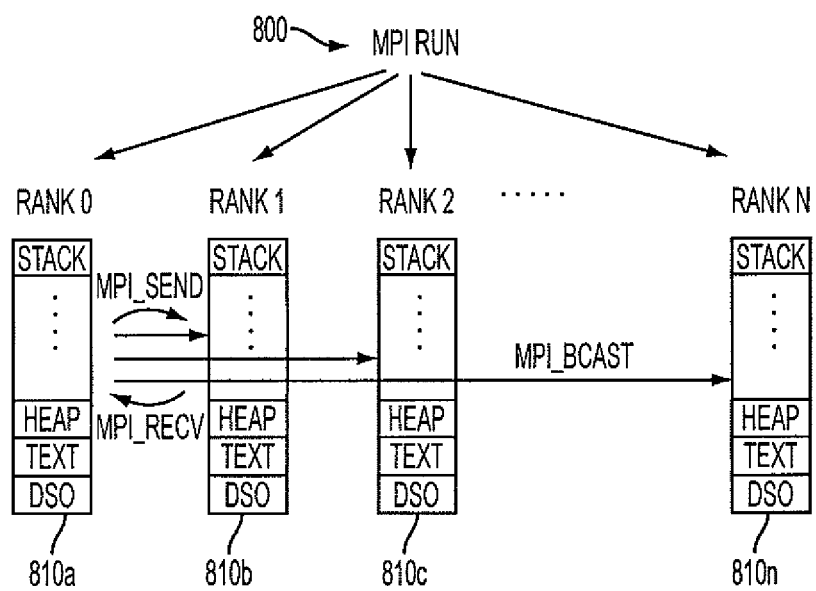
FIG. 8 is a data structure diagram of ranks in a typical operating environment for an alternate embodiment.

FIG. 8 illustrates an embodiment of Message Passing Interface (MPI) MPIRUN 800 which manages ranks 810a through 810n. MPI is used by applications to facilitate complex multithreading and each rank is a processing unit that may be used to process one or more threads in an application. As shown, each rank 810 has a number of different attributes associated with it, such as a stack, heap, text and DSO. Furthermore, as shown, each rank 810 can request operations to be performed by other ranks 810 via MPI_Send and broadcast a request to all ranks via MPI_BCAST. A rank 810 listens for requests via MPI_Recv. Both MPI_Send and MPI_Recv are blocking. When ranks 810a through 810n request standard IO, the request is intercepted by libFFIO in a similar manner to what was described in reference to FIG. 4. A user can also control specific rank performance via the FFIO_OPTS_RANK# environment variable, where # indicates the MPI rank number. Additionally, the ranks 810a through 810n are not necessarily restricted to a single machine and may reside on different machines in a cluster, similar to what is illustrated in FIG. 2. When at least one of ranks 810a through 810n reside in different computers on a cluster, a standard IO request occurs on the local machine and is intercepted in a similar manner to what is described in FIG. 4.

Figure 9:
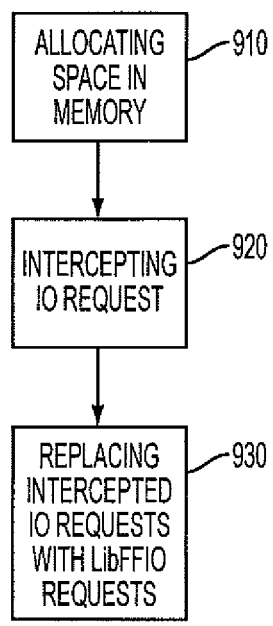
FIG. 9 is a block diagram of an alternative embodiment running on an operating system.

An alternative embodiment to what is shown in FIG. 4 is shown in FIG. 9. FIG. 9 illustrates an embodiment that can be implemented in any operating system. Memory is allocated 910 to alternative IO subroutines which mimic the IO subroutines provided by the operating system. A user application's request for system IO is intercepted 920 and that may occur through a mechanism in the operating system or through other subroutines which monitor a particular user application. The intercepted 920 subroutines are replaced 930 with the alternative subroutines that mimic the subroutines provided by the operating systems.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

What is claimed is:

1. A method of executing a software application for a user, on a computer system executing an operating system, the operating system providing a standard library having buffering subroutines that buffer data transfers between user applications and a secondary storage via system calls to a kernel of the operating system in a non-user controlled buffer, the standard library also having unbuffered subroutines that transfer data, without buffering, between the user applications and the secondary storage via system calls to the kernel of the operating system, the method comprising:

defining a plurality of user subroutines in a user software library distinct from the software application and distinct from the standard library, each user subroutine in the user software library mimicking an input functionality or an output functionality of a corresponding one of the buffering subroutines in the standard library that uses the non-user controlled buffer by utilizing a user-controlled buffer;

intercepting input/output requests by the software application to the standard library buffering subroutines that use the non-user controlled buffer;

determining if the request requires the non-user controlled buffer or the user controlled buffer;

passing the request to the user subroutine that uses the non-user controlled buffer if the request requires the non-user controlled buffer; and replacing each intercepted input/output request with a request to the user subroutine in the user software library that mimics the buffering subroutine of the intercepted input/output request that uses the non-user controlled buffer if the request requires the user controlled buffer, whereby the user subroutine performs the requested input/output functionality using the user-controlled buffer and an unbuffered subroutine of the standard library rather than the non-user controlled buffer.

2. The method as recited in claim 1, further comprising accessing the secondary storage using the user subroutines.

3. The method as recited in claim 2, wherein said accessing of the secondary storage is performed with simultaneous read and write access to contents thereof.

4. The method as recited in claim 1, wherein the buffering subroutines include open, read, and write access.

5. The method as recited in claim 1, wherein the buffering subroutines include at least one of file stream and file descriptor requests.

6. The method as recited in claim 1, wherein the buffering subroutines include POSIX compliant requests for at least one of input and output.

7. A computer system having secondary storage, the computer system executing an operating system that provides a standard library having buffering subroutines that buffer data transfers between a user application and the secondary storage via system calls to a kernel of the operating system in a non-user controlled buffer, the standard library also having unbuffered subroutines that transfer data, without buffering, between the user application and the secondary storage via system calls to the kernel of the operating system, the computer system comprising:

a user memory storing a user software library distinct from the application and distinct from the standard library, the software library comprising a plurality of user subroutines, each user subroutine in the software library mimicking an input functionality or an output functionality of a corresponding one of the buffering subroutines in the standard library that uses the non-user controlled buffer by utilizing a user-controlled buffer;

a central processing unit configured to:

intercept a request by the user application to the standard library to perform at least one of the buffering subroutines that use the non-user controlled buffer;

determine if the request requires the non-user controlled buffer or the user controlled buffer;

pass the request to the user subroutine that uses the non-user controlled buffer if the request requires the non-user controlled buffer; and pass the request to the user subroutine in the user software library that mimics the buffering subroutine of the intercepted request that uses the non-user controlled buffer if the request requires the user controlled buffer, whereby the user subroutine performs the requested input/output functionality using the user-controlled buffer and an unbuffered subroutine of the standard library rather than the non-user controlled buffer;

a network interface connected to at least one remote apparatus, wherein said network interface receives commands from the remote apparatus, the commands causing the central processing unit to alter data stored in a buffer controlled by the user.

8. The computer system as recited in claim 7, wherein said secondary storage operates with simultaneous read and write access.

9. A computer program product for use with a computer system having secondary storage, the computer system executing an operating system that provides a standard library having buffering subroutines that buffer data transfers between a user application and the secondary storage via system calls to a kernel of the operating system in a non-user controlled buffer, the standard library also having unbuffered subroutines that transfer data, without buffering, between the user application and the secondary storage via system calls to the kernel of the operating system, the computer program product comprising a non-transitory computer-readable medium having program code thereon, the program code comprising:

program code for defining a plurality of user subroutines in a user software library distinct from the application and distinct from the standard library, each user subroutine in the software user library mimicking an input functionality or an output functionality of a corresponding one of the buffering subroutines in the standard library that uses the non-user controlled buffer by utilizing a user-controlled buffer;

program code for intercepting input/output requests by the software application to the standard library buffering subroutines that use the non-user controlled buffer; and program code for determining if the request requires the non-user controlled buffer or the user controlled buffer;

program code for passing the request to the user subroutine that uses the non-user controlled buffer if the request requires the non-user controlled buffer; and program code for replacing each intercepted input/output request with a request to the user subroutine in the user software library that mimics the buffering subroutine of the intercepted input/output request that uses the non-user controlled buffer if the request requires the user controlled buffer, whereby the user subroutine performs the requested input/output functionality using the user-controlled buffer and an unbuffered subroutine of the standard library rather than the non-user controlled buffer.

10. The method as recited in claim 1, wherein intercepting input/output requests includes using an LD_PRELOAD function to dynamically preload the unbuffered user subroutines into the software application before loading the buffering subroutines.

11. The method as recited in claim 1, wherein the plurality of user subroutines further comprises non-vector processing based subroutines.

12. The computer system as recited in claim 7, wherein the plurality of user subroutines further comprise non-vector processing based subroutines.

13. The computer program product as recited in claim 9, wherein the plurality of user subroutines further comprise non-vector processing based subroutines.

14. The method as recited in claim 1, wherein the user application comprises a High Performance Computing and High Performance Technical Computing (HPC) application.

15. The computer system as recited in claim 7, wherein the user application comprises a High Performance Computing and High Performance Technical Computing (HPC) application.

16. The computer program product as recited in claim 9, wherein the user application comprises a High Performance Computing and High Performance Technical Computing (HPC) application.

* * * * *